United States Patent
Olkhovik et al.

(10) Patent No.: US 12,482,112 B2
(45) Date of Patent: Nov. 25, 2025

(54) DEVICE AND METHOD FOR OPTIMIZING POWER CONSUMPTION DURING FRAMES RENDERING

(71) Applicant: Huawei Technologies Co., Ltd., Shenzhen (CN)

(72) Inventors: Anton Yuryevich Olkhovik, Moscow (RU); Dmitrii Valentinovich Demidovich, Moscow (RU); Anna Andreevna Matvienko, Moscow (RU); Anita Andreevna Smirnova, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 191 days.

(21) Appl. No.: 18/253,682

(22) PCT Filed: Nov. 20, 2020

(86) PCT No.: PCT/RU2020/000625
§ 371 (c)(1),
(2) Date: May 19, 2023

(87) PCT Pub. No.: WO2022/108472
PCT Pub. Date: May 27, 2022

(65) Prior Publication Data
US 2024/0005526 A1    Jan. 4, 2024

(51) Int. Cl.
*G06T 7/246* (2017.01)
*G06T 5/77* (2024.01)
(Continued)

(52) U.S. Cl.
CPC ........... *G06T 7/248* (2017.01); *G06T 5/77* (2024.01); *G06T 7/0002* (2013.01);
(Continued)

(58) Field of Classification Search
USPC ........................................................ 345/520
See application file for complete search history.

(56) References Cited

U.S. PATENT DOCUMENTS

| | | |
|---|---|---|
| 7,075,988 B2 | 7/2006 | Lee et al. |
| 7,408,986 B2 | 8/2008 | Winder |

(Continued)

FOREIGN PATENT DOCUMENTS

| | | |
|---|---|---|
| CN | 103140877 B | 5/2016 |
| CN | 103765892 B | 9/2017 |

(Continued)

OTHER PUBLICATIONS

Kent W. Nixon et al., "Mobile GPU Power Consumption Reduction via Dynamic Resolution and Frame Rate Scaling", Oct. 5, 2014, total 5 pages.

(Continued)

*Primary Examiner* — James A Thompson
*Assistant Examiner* — Kim T Tran
(74) *Attorney, Agent, or Firm* — Slater Matsil, LLP

(57) ABSTRACT

This application relates to a camera control method and apparatus, and a storage medium. The method is applied to a first terminal device, and the method includes: receiving image data from a second terminal device, where the image data is captured by the second terminal device in a photographing process; determining an operation command and status information, where the operation command is an operation command for the photographing process of the second terminal device, and the status information indicates an execution status of the operation command executed by the second terminal device; displaying a picture based on the image data; and displaying the execution status of the operation command on the picture based on the operation command and the status information.

22 Claims, 14 Drawing Sheets

(51) Int. Cl.
*G06T 7/00* (2017.01)
*G06T 15/00* (2011.01)
*G06V 10/764* (2022.01)
*G06V 10/94* (2022.01)

(52) U.S. Cl.
CPC .......... *G06T 15/005* (2013.01); *G06V 10/764* (2022.01); *G06V 10/955* (2022.01); *G06T 2207/10024* (2013.01); *G06T 2207/30168* (2013.01); *G06T 2207/30244* (2013.01)

(56) References Cited

U.S. PATENT DOCUMENTS

| | | | |
|---|---|---|---|
| 7,800,610 | B2 | 9/2010 | Bakalash et al. |
| 7,812,845 | B2 | 10/2010 | Bakalash et al. |
| 7,944,450 | B2 | 5/2011 | Bakalash et al. |
| 8,102,398 | B2 | 1/2012 | Bajic et al. |
| 8,284,207 | B2 | 10/2012 | Bakalash et al. |
| 8,555,099 | B2 | 10/2013 | Marinkovic et al. |
| 8,787,696 | B1 | 7/2014 | Biswas et al. |
| 8,872,812 | B2 | 10/2014 | Greenberg et al. |
| 8,872,838 | B2 | 10/2014 | Schneider et al. |
| 9,355,585 | B2 | 5/2016 | Tripathi et al. |
| 9,426,414 | B2 | 8/2016 | Dane et al. |
| 9,747,657 | B2 | 8/2017 | Apodaca |
| 9,750,400 | B2 | 9/2017 | Khait et al. |
| 10,051,210 | B2 | 8/2018 | Nussmeier et al. |
| 10,062,181 | B1* | 8/2018 | Longhurst ................. G06T 7/13 |
| 2003/0233592 | A1 | 12/2003 | Lin et al. |
| 2009/0116732 | A1* | 5/2009 | Zhou .................... H04N 13/261 348/42 |
| 2010/0027663 | A1 | 2/2010 | Dai et al. |
| 2014/0258754 | A1 | 9/2014 | Akenine-Moller et al. |
| 2015/0285625 | A1 | 10/2015 | Deane |
| 2017/0013279 | A1 | 1/2017 | Puri et al. |
| 2017/0064329 | A1* | 3/2017 | Lawrence .......... H04N 21/4402 |
| 2017/0094311 | A1* | 3/2017 | Chou .................... H04N 19/53 |
| 2017/0243324 | A1 | 8/2017 | Mierle et al. |
| 2020/0137409 | A1 | 4/2020 | Michail et al. |

FOREIGN PATENT DOCUMENTS

| | | |
|---|---|---|
| CN | 104980748 B | 5/2018 |
| CN | 105379266 B | 8/2018 |
| CN | 105814878 B | 6/2019 |
| EP | 1671273 B1 | 11/2012 |
| EP | 2775401 A3 | 10/2014 |
| EP | 3085071 B1 | 8/2020 |
| JP | 6412162 B2 | 10/2018 |
| KR | 101456723 B1 | 11/2014 |
| RU | 2696318 C1 | 8/2019 |
| WO | 2015168189 A1 | 11/2015 |

OTHER PUBLICATIONS

Yu Yan et al., "Optimizing Power Consumption of Mobile Games", Oct. 4, 2015, total 5 pages.
Chanyou Hwang, "RAVEN: Perception-aware Optimization of Power Consumption for Mobile Games", Oct. 4, 2017, total 13 pages.
Abhijit Patait, "An Introduction to the NVIDIA Optical Flow SDK", Feb. 13, 2019, total 12 pages.

* cited by examiner

DEVICE AND METHOD FOR OPTIMIZING POWER CONSUMPTION DURING FRAMES RENDERING

CROSS-REFERENCE TO RELATED APPLICATIONS

This application is a National Stage of International Application No. PCT/RU2020/000625, filed on Nov. 20, 2020, which is hereby incorporated by reference in their entireties.

TECHNICAL FIELD

The present disclosure relates generally to computer graphics processing, particularly to optimizing power consumption during frames rendering. The disclosure is especially concerned with power saving in high framerate graphics processing. The disclosure proposes, to this end, a device and a method for reducing power consumption on real-time graphics processing.

BACKGROUND

High frame rate displays are increasingly popular in modern smartphones. Several years ago, most mobile devices were typically equipped with 60 Hz screens (i.e., screens having a 60 Hz refresh rate). But nowadays the number of 90 Hz (or even higher) displays is increasing rapidly. Higher refresh rate displays, or higher frame rate displays, lead to a lower visual latency, a smoother gameplay appearing, and an improved user experience.

However, a problem is that devices with high frame rate displays consume more power and thus substantially reduce battery life. Also, the power consumption of the whole system is increased due to the fact that applications/software that need to process graphics must generate a higher number of frames. For instance, the power consumption of a central processing unit (CPU) and a graphics processing unit (GPU) of a device with a 120 Hz display may increases by a factor of 1.5-2 during graphics rendering when compared to a device with a 60 Hz display. Of course, the physical capacity of the battery is limited.

Therefore, a solution for reducing power consumption, which is caused due to the increased frame rate during frames rendering, is desired.

SUMMARY

In view of the above-mentioned deficiencies, embodiments of the present disclosure aim to optimize, particularly, reduce power consumption caused during frames rendering, for instance, when processing graphics. In particular, an objective is to propose an approach for reducing or optimizing a power consumption caused during real-time graphics rendering with a high framerate. Another objective is to provide a solution compatible with any application needs to perform the frames rendering. One aim of the disclosure is to also ensure that a quality of the rendered frames is not affected.

These and other objectives are achieved by embodiments as provided in the enclosed independent claims. Advantageous implementations of the embodiments are further defined in the dependent claims.

A first aspect of the disclosure provides an entity for processing image data, wherein the entity is configured to: obtain (e.g. by CPU and/or GPU) image data comprising a sequence of original frames from a graphics application; determine (e.g. by CPU) whether to enable frame prediction for rendering the image data, based on information for enabling prediction obtained from the graphics application; Enable (e.g. by CPU and/or GPU) the graphics application to render a subset of the sequence of original frames in the image data to obtain rendered original frames, if the frame prediction is enabled; insert (e.g. by CPU and/or GPU) one or more predicted frames into the rendered original frames obtained from the graphics application, wherein each of the one or more predicted frames is computed based on one or more original frames of the image data, wherein each original frame that is not rendered by the graphics application is replaced by one of the predicted frames; and output (e.g. by CPU and/or GPU) rendered image data, wherein the rendered image data comprises rendered original frames from the graphics application and the one or more predicted frames. As an example, the rendered image data are displayed by a display.

In particular, the entity provided in the first aspect may comprise necessary processing circuitry for performing the functions described herein, such as a CPU/GPU and a memory. To implement the embodiments of the present invention, the CPU and/or GPU reads instructions and/or data stored in the memory, and demand/message and data are transmitted between the CPU and GPU. The graphics application may be an application that requires graphics processing such as frames rendering, for instance, the graphics application may be a 3D video game. The entity of the first aspect accordingly allows optimizing, particularly reducing, the power consumption caused during the frames rendering when running the graphics application. This benefit is achieved by enabling frame prediction for frames rendering. In particular, a part of the frames generated by the graphics application (i.e., the original frames) can be replaced with predicted frames, which can be calculated by the entity of the first aspect. Since at least a part of the original frames is predicted, i.e., not rendered by the graphics application, the power consumption for rendering these frames of the image data can be reduced. Notably, an original frame rate of the graphics processing can still be kept, since the discarded original frames that are not rendered are replaced with the predicted ones, but are not only discarded without replacement.

It should be further noted that, it may be possible to modify image data processing pipeline to obtain the image data. This data may be in a different form than original frames. For example, it may be possible to split a 3D scene layer and a user interface (UI) scene layer, and use only 3D layer in prediction algorithms.

In an implementation form of the first aspect, the information for enabling prediction includes a first set of information, and the entity is further configured to obtain the first set of information by analyzing (e.g. by CPU and/or GPU) the graphics application programming interface commands from the graphics application, wherein the first set of information comprises color information related to the image data, and in addition at least one of: depth information related to the image data, a first class object mask, a second class object mask, and one or more camera matrices. As an example, The GPU obtains the first set of information and sends it to the CPU. Then the CPU is able to determine whether to enable the frame prediction.

Typically, the first set of information may be semantic scene information, which may be used for drawing frames on a display. It may be also obtained from the image data, or from the rendering process of the graphics application.

Such information typically includes at least color values for every pixel to be shown on the display. In addition, the depth value of every pixel on the display, textures, stencils, and/or camera matrices may also be included. Notably, the first set of information may be representative of a scene that is expected to be drawn on the display when corresponding frames are rendered.

In an implementation form of the first aspect, the information for enabling prediction includes a second set of information, and the entity is further configured to obtain the second set of information by: analyzing (e.g. by CPU and/or GPU) the graphics application programming interface commands from the graphics application to obtain a first set of information including color information related to the image data and at least one of: depth information related to the image data, a first class object mask, a second class object mask, and one or more camera matrices; and extracting the second set of information based on the first set of information, wherein the second set of information comprises at least one of: a current graphics application scenario, object classification, a camera position, a camera orientation, and a camera movement behavior; and determine whether to enable the frame prediction based on the second set of information.

In particular, the first set of information may be used to obtain the second set of information. Based on the second set of information, a decision can be made on a quality of predicted frames in advance. Further, different prediction algorithms may be selected to improve the prediction quality based on the second set of information. As an example, the first set of information obtained by the GPU is send to the CPU. The CPU thus is able to extract the second set of information and then determine whether to enable the frame prediction.

In an implementation form of the first aspect, the entity is further configured to classify (e.g. by CPU and/or GPU) objects of the image data into at least a first class and a second class based on the first set of information, wherein an object of the first class has a constant position within a coordinate system, and an object of the second class has a dynamic position within the coordinate system.

Notably, an object in an image or in a scene may represent a region of the image comprising a set of pixels with the same or similar properties. Optionally, object classification can be determined according to the first set of information, i.e., the semantic scene information. The first class object may also be a static object, and the second class object may also be a dynamic object. In particular, object classification may be comprised in the second set of information.

In an implementation form of the first aspect, the entity is further configured to determine to enable the frame prediction, if one or more of the following conditions are met:
the current graphics application scenario matches one or more predetermined graphics application scenarios;
the camera movement behavior does not include excessive rotation and/or excessive linear movement; and
a ratio of the objects of the first class and the objects of the second class does not exceed a first threshold.

To ensure the prediction quality, optionally, the frame prediction may be enabled only for certain graphics application scenarios. For instance, if the graphics application is a video game, information about a current gameplay scenario may be used for deciding whether a current game mode is expected to have visual artifacts in the predicted frames. If visual artifacts are expected in the predicted frames, the current gameplay scenario may be not suitable for the frame predictions. Optionally, if an expected scene includes excessive dynamic objects, the entity may decide not to enable the frame prediction.

It should be noted that for some cases (e.g., with a high prediction quality requirement), it may be designed that for enabling the frame prediction, all conditions should be met. For other cases, it may be enough to enable the frame prediction when one or two conditions are met. This may be configurable according to specific implementations.

In an implementation form of the first aspect, the entity is further configured to compute (e.g. by GPU) the one of more predicted frames using a frame-warping process.

In particular, the frame-warping process is specifically designed to reduce power consumption of the whole system.

In an implementation form of the first aspect, the entity is further configured to compute a predicted frame by calculating (e.g. by CPU and/or GPU) a correspondence between at least two original frames of the image data; and computing (e.g. by GPU) the predicted frame based on the correspondence and at least one original frames of the image data. As an example, the CPU calculates the correspondence between the at least two original frames and sends it to the GPU. Then the GPU is able to compute the predicted frame.

In particular, in the frame-warping process, a calculated correspondence between original frames may be obtained and used for reconstructing (i.e. restricting or generating) of predicted frames.

In an implementation form of the first aspect, an original frame comprises a plurality of image fragments, wherein the calculating the correspondence between the at least two original frames of the image data includes: calculating (e.g. by GPU) an image fragment correspondence between at least two image fragments of the at least two original frames using a first algorithm, if the at least two image fragments of the at least two original frames are marked as one or more objects of the first class; or calculating (e.g. by GPU) an image fragment correspondence between image fragments of the at least two original frames using a second algorithm, if the at least two image fragments of the at least two original frames are marked as one or more objects of the second class.

As described above, all objects on the image data, namely all objects on the expected scene, may be divided in two groups, i.e., static and dynamic. Different algorithms for calculating the image fragment correspondence should be used for different groups. In particular, an image fragment may have a size of one pixel. Different motion algorithms may be used for pixels that are marked as dynamic objects, and for pixels that are marked as static objects.

In an implementation form of the first aspect, the computing (e.g. by GPU) the one or more predicted frames using the frame-warping process includes computing one or more predicted image fragments for the predicted frame using the frame-warping process based on the calculated image fragment correspondence and at least one image fragments.

In particular, for the image fragments that are marked as static objects (i.e., object of the first class), the corresponding predicted image fragment is calculated based on the image fragment correspondence calculated using the first algorithm. Similarly, for the image fragments that are marked as dynamic objects (i.e., object of the second class), the corresponding predicted image fragment is calculated based on the image fragment correspondence calculated using the second algorithm. Notably, such highly efficient separation of objects by classes (for using different image fragment correspondence algorithms) ensures an improved visual quality, and achieves power consumption benefit.

In an implementation form of the first aspect, wherein the computing the one or more predicted frames using the frame-warping process further includes filling (e.g. by GPU) a missing area of the predicted frame after performing the frame-warping process, using an in-painting method, wherein the predicted frame comprises a plurality of image fragments, and the missing area is the part of the predicted frame other than the one or more predicted image fragments.

As previously described, the one or more predicted image fragments may be calculated for the predicted frame. That is, some pixels of the predicted frame might not have their values computed during the frame-warping processing. The in-painting method (such as a blur algorithm) may be used for filling the missing pixels of the predicted frame. In particular, that method may use weighted averaging of nearby pixels belonging to a static object for filling the missing area.

In an implementation form of the first aspect, the image fragment correspondence comprises a motion vector (MV), wherein the first algorithm comprises a reprojection technique, and the second algorithm comprises a motion estimation algorithm. As an example, the GPU calculates the MV and further calculates the image fragment correspondence. As another example, the GPU calculates the MV and sends it to the CPU to make the CPU be able to calculate the image fragment correspondence.

In a particular implementation, a simple version of the image fragment correspondence based on two-component offset may be calculated. This two-component offset may be called a MV. It is worth mentioning that other high-order correspondence models may also be applied, for instance in order to improve image fragments matching.

In an implementation form of the first aspect, the frame-warping process comprises: constructing (e.g. by CPU) one or more grids for the at least two original frames within a coordinate system; and performing the frame-warping process according to the one or more grids.

For each original frame at least one main grid within the coordinate system may be defined. It is also possible to define at least one other grid, where coordinates of vertices of the new grid might not be aligned with that of the main grid. Grids that cover all frames may be used. To construct predicted frames, a transformation according to a particular prediction algorithm for each vertex of this grid may be applied, and a distorted image may be created accordingly. In particular, since objects are classified into two different types, two different grids for objects of each class may be used, and the warping process may also be applied independently.

In an implementation form of the first aspect, the entity is further configured to evaluate (e.g. by CPU and/or GPU) a quality of each of the one or more predicted frames; and discard (e.g. by CPU) a predicted frame, if the quality of the predicted frame does not fulfil one or more requirements. As an example, the CUP determines to discard a predicted frame based on the quality evaluated by itself or sent from the GPU.

To ensure the prediction quality and to prevent of artifacts on the predicted frames, this disclosure proposes several quality control approaches for estimating the quality of each predicted frame. In particular, the evaluation may be performed per frame in real-time.

In an implementation form of the first aspect, the entity is configured to evaluate the quality of each of the one or more predicted frames by: evaluating (e.g. by GPU) a quality metric over the predicted frame on a GPU; and determining (e.g. by GPU) that the quality of the predicted frame does not fulfil the one or more requirements, if one or more artifacts are detected according to the quality metric.

One of the quality control approaches may evaluate a low complexity quality metric over one or more predicted frames on the GPU, for example, a number of the missing pixels for detecting big in-painting areas, and/or an excessively large motion to control temporal stability. This approach can be used to trigger a fallback mechanism, i.e., if artifacts were detected according to the value of this quality metric, the predicted frame should not be used, i.e., will be discarded.

In an implementation form of the first aspect, the entity is configured to evaluate the quality of each of the one or more predicted frames by analyzing (e.g. by CPU) data of a following original frame obtained from a CPU, wherein the following original frame is a frame next to the original frame that was replaced by the predicted frame; and determining (e.g. by CPU and/or GPU) that the quality of the predicted frame does not fulfil the one or more requirements, if a difference between the data of the following original frame and the predicted frame exceeds a second threshold.

Another quality control approach may depend on information about camera motion in the "future" frame. In particular, if the "future" motion differs too much from the predicted frames, the fall mechanism may also be triggered. Notably, the data being analyzed here may be from next original frame that used in rendering process (for example this can be a camera matrix from next original frame).

In an implementation form of the first aspect, the graphics application comprises one of: a game application, an augmented reality (AR) application, and/or a virtual reality (VR) application.

Notably, embodiments of this disclosure propose a solution that can be compatible with any graphics applications, or any AR/VR systems.

A second aspect of the disclosure provides a terminal for processing image data, comprising the entity according to any one of claims 1 to 16. The terminal may be any of mobile phone (e.g. smart phone), desktop computer, laptop, PAD, etc.

A third aspect of the disclosure provides a method performed by an entity, wherein the method comprises: obtaining image data comprising a sequence of original frames from a graphics application; determining whether to enable frame prediction for rendering the image data, based on information for enabling prediction obtained from the graphics application; enabling the graphics application to render a subset of the sequence of original frames in the image data to obtain rendered original frames, if the frame prediction is enabled; inserting one or more predicted frames into the rendered original frames obtained from the graphics application, wherein each of the one or more predicted frames is computed based on one or more original frames of the image data, wherein each original frame that is not rendered by the graphics application is replaced by one of the predicted frames; and outputting rendered image data, wherein the rendered image data comprises rendered original frames from the graphics application and the one or more predicted frames.

Implementation forms of the method of the second aspect may correspond to the implementation forms of the entity of the first aspect described above. The method of the second aspect and its implementation forms achieve the same advantages and effects as described above for the entity of the first aspect and its implementation forms.

A fourth aspect of the disclosure provides a computer program product comprising a program code for carrying out, when implemented on a processor, the method according to the second aspect and any implementation forms of the second aspect.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which.

DESCRIPTION OF EMBODIMENTS

Illustrative embodiments of the disclosure are described with reference to the figures. Although this description provides a detailed example of possible embodiments and implementations, it should be noted that the details are intended to be exemplary and in no way limit the scope of the application.

Moreover, an embodiment/example may refer to other embodiments/examples. For example, any description including but not limited to terminology, element, process, explanation and/or technical advantage mentioned in one embodiment/example is applicative to the other embodiments/examples.

This disclosure proposes an approach to solve the problem of power consumption during frames rendering in high frame rate graphics applications (like games and etc.).

Embodiments of the disclosure represent a power saving system with GPU/CPU-based rendering complimenting any graphics application. The system may be hardware-independent, universal for different configurations of devices and doesn't substantially affect the quality of rendered frames.

The field of the disclosure is real-time graphic applications, which supports high framerate.

Figure 1A:
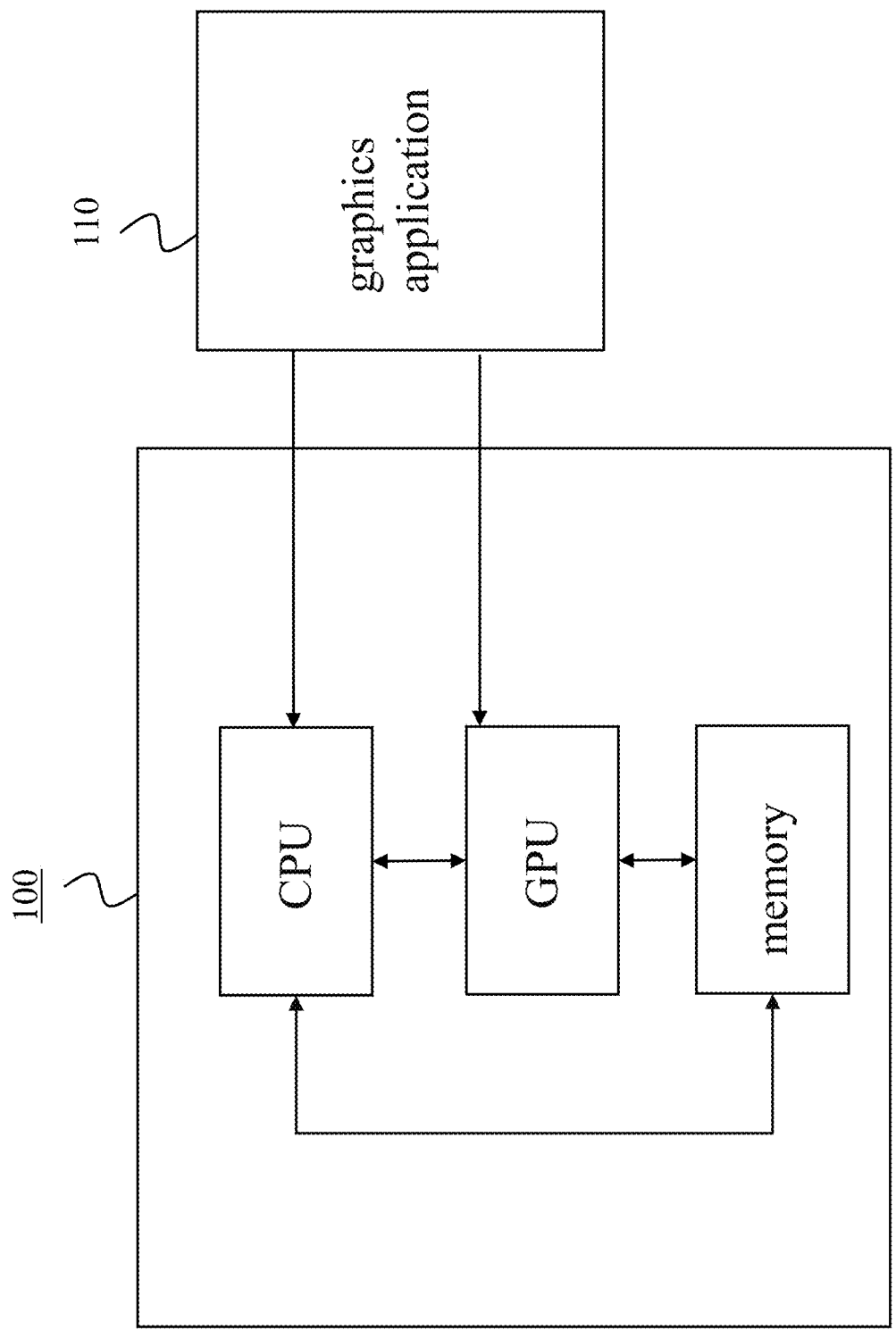
FIG. 1A shows the structure of an entity according to an embodiment of the disclosure.
Figure 1B:
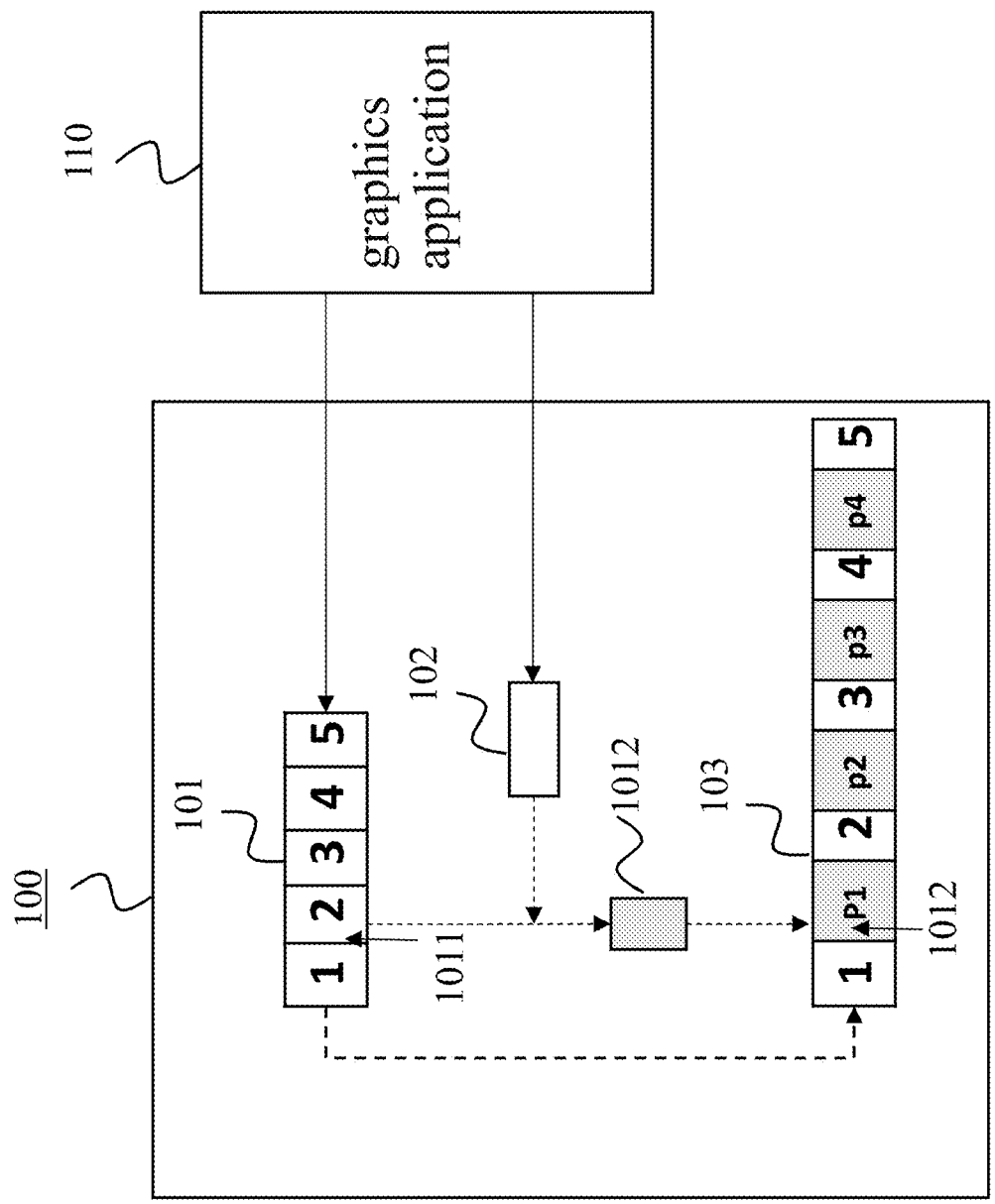
FIG. 1B shows a brief diagram of process image data according to an embodiment of the disclosure.

FIG. 1A and FIG. 1B show structure of an entity 100 and a brief diagram for processing image data by the entity 100 according to an embodiment of the disclosure. The entity 100 may comprise processing circuitry (not shown) configured to perform, conduct or initiate the various operations of the entity 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. Especially, the processor(s) of the entity 100 may comprise, e.g., one or more instances of a CPU, a GPU, a NPU, a processing unit, a processing circuit, a processor, an ASIC, a microprocessor, or other processing logic that may interpret and execute instructions. The entity 100 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the entity 100 to be performed. In one embodiment, the processing circuitry comprises one or more processors and a non-transitory memory connected to the one or more processors. The non-transitory memory may carry executable program code which, when executed by the one or more processors, causes the entity 100 to perform, conduct or initiate the operations or methods described herein.

The entity 100 may be included in a terminal that may be any of mobile phone (e.g. smart phone), desktop computer, laptop, PAD, etc. In addition to the entity, the terminal may further includes a display. Therefore when running a graphic application, the terminal may display image of the graphic application based on the image data processing according to the embodiment of the invention.

In particular, the entity 100 is configured to obtain image data 101 comprising a sequence of original frames 1011 from a graphics application 110. In particular, the graphics application may be an application that requires graphics processing such as rendering, for instance, the graphics application may be a 3D video game. The entity 100 is further configured to determine whether to enable frame prediction for rendering the image data 101, based on information 102 for enabling prediction obtained from the graphics application 110. Accordingly, if the frame prediction is enabled, the entity 100 is configured to enable the graphics application 110 to render a subset of the sequence of original frames 1011 in the image data 101 to obtain rendered original frames.

Accordingly, the entity 100 is configured to insert one or more predicted frames 1012 into the rendered original frames obtained from the graphics application 110. In particular, each of the one or more predicted frames 1012 is computed based on one or more original frames 1011 of the image data 101. Notably, each original frame 1011 that is not rendered by the graphics application 110 is replaced by one of the predicted frames 1012.

Then, the entity 100 is further configured to output rendered image data 103, wherein the rendered image data 103 comprises rendered original frames from the graphics application 110 and the one or more predicted frames 1012. Notably, by outputting rendered image date 103, the entity 100 may draw them on a display. The display may be comprised in the entity 100, or may be an external display.

In particular, the entity 100 may modify image data processing pipeline to obtain image data 101. For example, a 3D scene layer and a UI scene layer may be split, and only the 3D layer is used in prediction algorithms.

The entity 100 further modifies application behavior to allow the graphics application 110 to reduce a quantity of frames that it is going to render. For example, the graphics application 110 may render 90 frames per second. When the entity 100 determines to enable frame prediction, the graphics application 110 may only render 45 frames per second, and the entity 100 may "render" the remaining missing 45 frames for the graphics application 110, i.e., by computing the one or more predicted frames 1012. As the original frames are rather replaced that simply discarded without replacement, final frame rate will still be 90 frames per second.

Embodiments of this disclosure propose the entity 100 that allows optimizing, particularly reducing, power consumption caused during frames rendering, for instance, for running the graphics application. This benefit is achieved by allowing the graphics application 110 not to render a part of frames (i.e., the original frames ion), and inserting the predicted frames, which are calculated by the entity 100, instead. Since at least a part of the frames can be predicted, the power consumption for rendering the frames can be reduced. Notably, an original frame rate of the graphics processing can still be kept, since this part of the original frames 1011 is replaced with the predicted one but not simply removed.

Figure 2:
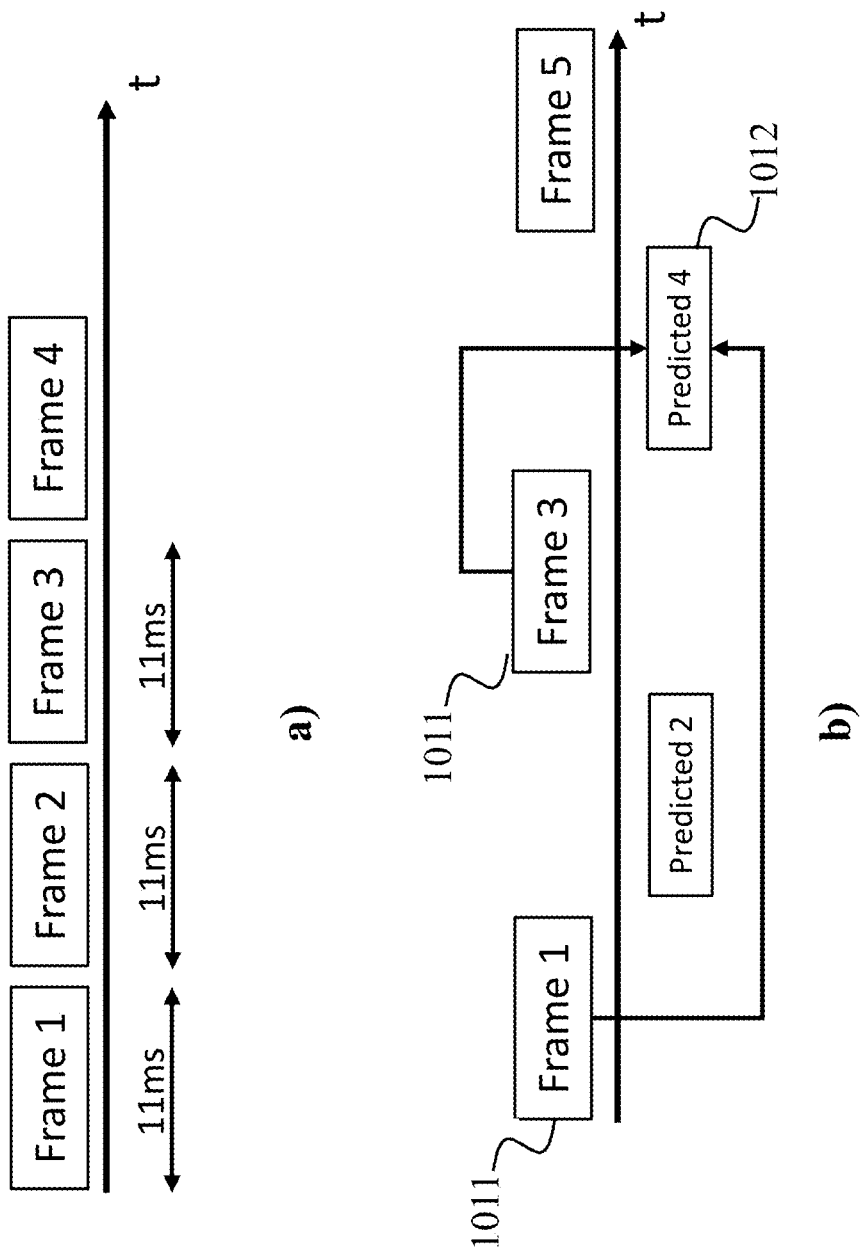
FIG. 2 shows a rendering timeline in a conventional approach (FIG. 2a)), and a rendering timeline according to an embodiment of this disclosure (FIG. 2b)).
Figure 3A:
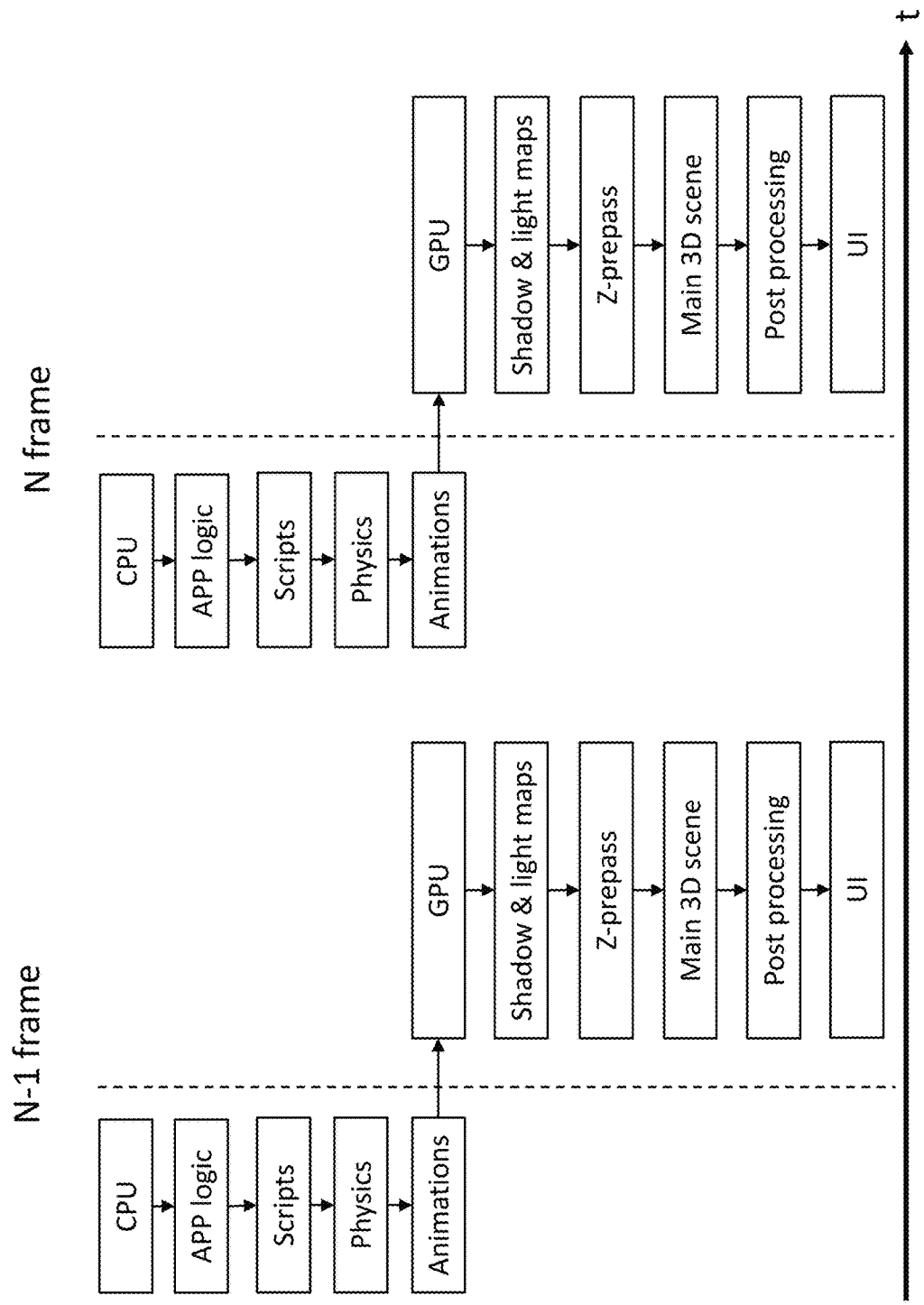
FIGS. 3a and 3b show an example of a rendering pipeline for two frames in a conventional approach (FIG. 3a), and an example of a rendering pipeline according to an embodiment of this disclosure (FIG. 3b).
Figure 3B:
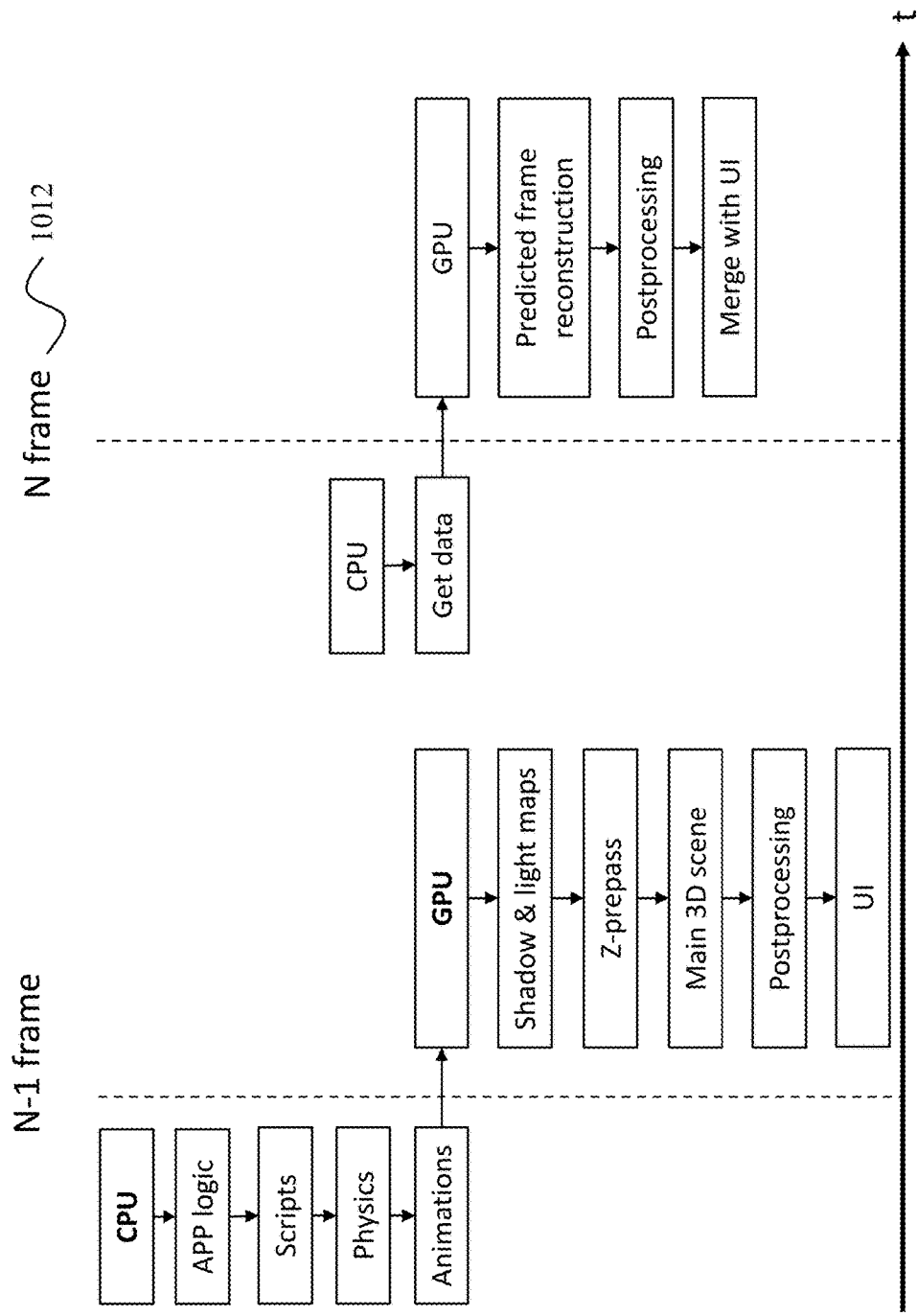

FIG. 2 shows a rendering timeline in a conventional approach (FIG. 2*a*), and a rendering timeline according to an embodiment of this disclosure (FIG. 2*b*). FIGS. 3*a* and 3*b* show an example of a rendering pipeline for two frames in a conventional approach (FIG. 3*a*), and an example of a rendering pipeline according to an embodiment of this disclosure (FIG. 3*b*).

It can be seen in FIG. 2*a*) that in a conventional rendering processing, frames are processed in order. FIG. 3*a*) further shows that for rendering each of two consecutive frames, in a particular example, CPU first goes through several steps and provides animations to GPU, and GPU further turns them into a display (a scene) on a UI.

According to embodiments of this disclosure, predicted frames are calculated. As the example shown in FIG. 2*b*), predicted frame 4 may be calculated based on the frames 1 and 3, wherein the frames 1 and 3 are both original frames generated by a graphics application. As shown in FIG. 3*b*), for rending a predicted frame, the CPU may directly obtain data (e.g., from a previous frame that has been processed) and may provide the data to the GPU. Accordingly, the GPU may need to reconstruct the predicted frame and may merge it with the UI. In particular, "UI" here may refer to a UI in game frame. A graphics application may first render a 3D scene and then draw some UI elements over the main scene. For example, the UI elements can be buttons for a user to interact with game, text messages, a game map and etc.

Notably, a power consumption caused by the GPU may be slightly increased, but a power consumption caused by the CPU can be significantly reduced. In a specific example, for the case shown in FIG. 2*a*) and FIG. 3*a*), CPU may use 444 mA, and GPU may use 164 mA. That makes a sum of power consumption to be ~966 mA (this may also include power consumptions caused by other parts, such as WiFi, GSM, etc). However, for the case shown in FIG. 2*b*) and FIG. 3*b*), CPU may only use 242 mA, and GPU may use 191 mA. That makes a sum of power consumption to be ~758 mA. It can be clearly seen that a power benefit can be achieved by implementing the approach proposed in this disclosure.

The input data for the entity 100 to determine whether a power saving mode can be enabled, i.e., whether to enable the frame prediction, may be semantic scene information, which may be obtained from the graphics application 110 by analyzing graphics API commands, and may also be obtained from rendered frames from the graphics application 110. As shown in FIG. 2*a*), frames may be rendered one by one in the CPU and GPU. That is, when a frame is rendered, different information may be calculated and can thus be obtained during different steps of the rendering. After a previous frame is rendered, a rendering result can be obtained from the graphics application 110. The semantic information may include at least color, additionally depth, dynamic object mask (a second class object mask), textures, stencils and one or more camera matrices. Notably, such information may be used for drawing frames, i.e., the scene, on a display.

According to an embodiment of this disclosure, the graphics application 110 may be a video game. Current gameplay situation can be determined from the above-mentioned information. Especially, such information can be used for:

1. Detecting current gameplay scenario (e.g., aiming, driving, and running).

2. Classifying objects of a scene into at least two kinds, called static and dynamic, where static objects have constant world space position and dynamic objects change their world space position due to their movement.

3. Extracting camera position, orientation and movement on the scene.

According to this information, i.e., the semantic scene information and information obtained/extracted from it, a decision may be made on a quality of a predicted frame 1012 in advance. If the predicted frame 1012 is expected to not contain visible artifacts, reconstruction process of the predicted frame 1012 may start.

Reconstruction of predicted frames 1012 is based on the idea that a predicted frame 1012 can be constructed by any method. Preferably, it is desired that the method should be very simple in a manner that it would consume less power compared to a power consumption for rendering original frame 1011. In particular, such a method should work fine for a major part of application frames. It may allow some noticeable artifacts shown on other areas.

Input data for the reconstruction process may concern several original frames ion, in a particular example, two original frames 1011 may be used.

Reconstruction process according to embodiments of this disclosure may perform the following steps:

Step 1: For every original frame 1011, at least one main grid within the coordinate system is defined.

It's possible to define, in addition to the main grid, at least one other grid, where coordinates of vertices of the other grid might not be aligned with that of the main grid.

Another option provided by the present disclosure is using a grid with an adaptive block size in cases where bad quality results may be expected for the predicted frame 1012.

Step 2: Calculation of an image fragments correspondence between two original frames ion.

In a particular case, each image fragment may have a size of one pixel.

As mentioned above, all objects on the scene are divided in two groups—static and dynamic. Different motion estimation algorithms may be used for pixels that are marked as dynamic objects and for pixels that are marked as static objects.

Figure 4:
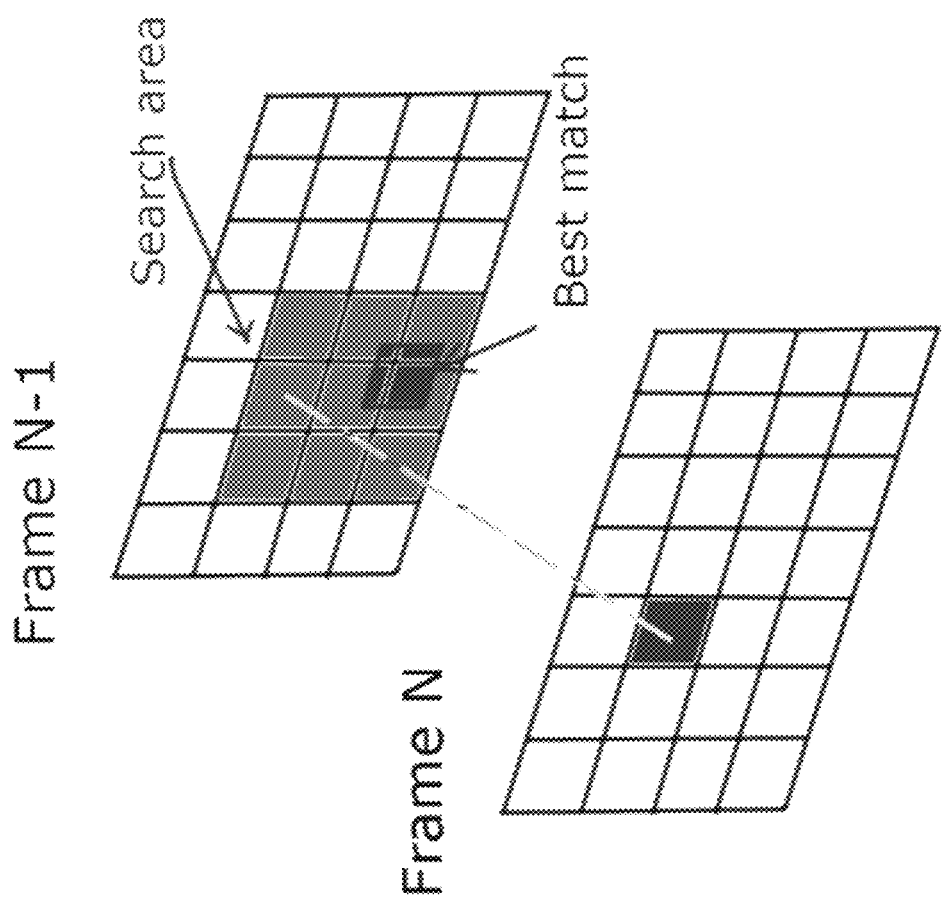
FIG. 4 shows a correspondence between two original frames according to an embodiment of the disclosure.

It should be noted that each frame includes a number of image fragments on the frame. FIG. 4 shows an image fragment correspondence between two original frames according to an embodiment of the disclosure. It can be seen that for one image fragment on frame N, after searching in a search area, a best match of that image fragment on frame N−1 is found.

A center of each fragment may be considered as a node of the grid. As an example of the correspondence between at least two original frames, an image fragment correspondence means that a correspondence between one node on the first frame and a same node on the second frame is found. As previously discussed, this disclosure proposes to classify objects into two types. Accordingly, two different grids for object of each class may be used. However, it is also possible that objects are classified into more than two types, and thus more grids may be defined.

In particular, according to an embodiment of the disclosure, the entity 100 may be configured to calculate an image fragment correspondence between at least two image fragments of the at least two original frames ion using a first algorithm, if the at least two image fragments of the at least two original frames ion are marked as one or more objects of the first class. Accordingly, the entity 100 may be configured to calculate an image fragment correspondence between image fragments of the at least two original frames ion using a second algorithm, if the at least two image fragments of the at least two original frames ion are marked as one or more objects of the second class. In particular, the first algorithm should be different from the second algorithm.

Step 3: After calculation of the image fragments correspondence, the predicted frame 1012 is reconstructed by so-called frame-warping process, which was specifically designed to reduce power consumption of the whole system.

Frame-warping process means a reconstructing of predicted frame 1012 according to calculated correspondence between image fragments of original frame 1011 and image fragments of predicted one.

Frame-warping process is performed according to constructed grids, where new pixel value (e.g., color value) is computed according to a predefined image warping process of at least one of original frames 1011.

In the present solution frame-warping may be implemented as extrapolation of calculated image fragments correspondence.

Step 4: Some pixels of the predicted frame 1012 may not have their values computed during frame-warping. These pixels may be named as missing pixels. Optionally, the last step may be filling the missing pixels with an in-painting method.

New results for frame reconstruction are achieved by improving visual quality due to highly efficient objects and motion fields' separation in original frames 1011 according to semantic information extracted from the graphics application 110.

As previously mentioned, reconstruction of predicted frames 1012 should be very simple for reducing power consumption. However, a minority of game frames may cause noticeable artifacts. Embodiment of the present disclosure further provide approaches for estimating quality and for preventing artifacts on predicted frames 1012.

There may be three approaches for quality estimation proposed according to embodiments of this disclosure:

The first approach is analyzing semantic scene information, i.e., the first set of information 102, in real-time to adaptively control a ratio between original and predicted frames. Specifically, this may include:

1. Using information about the current gameplay scenario for deciding whether the current game mode is expected to have visual artifacts in predicted frames; disabling frame prediction if visual artifacts are expected.

2. Analyzing camera movement behavior; disabling frame prediction if it includes excessive rotation and/or excessive linear movement.

3. Analyzing static and dynamic objects proportion; disabling frame prediction if it's above certain threshold.

According to steps 1-3, an immediate fallback mechanism that disables the frame prediction is provided.

It should be noted that this disclosure also introduces an intelligent methodology for deciding whether to enable the power saving, i.e., the frame prediction. According to an embodiment of the disclosure, the entity 100 may be configured to determine to enable the frame prediction, if one or more of the following conditions is met:

the current graphics application scenario matches one or more predetermined graphics application scenarios;

the camera movement behavior does not include excessive rotation and/or excessive linear movement; and a ratio of the objects of the first class and the objects of the second class does not exceed a first threshold.

That is, to ensure the prediction quality the frame prediction may be enabled only for certain graphics application scenarios. It should be noted that for some case (e.g., with a high prediction quality requirement), it may be designed that for enabling the frame prediction, all conditions should be met. For other cases, it may be enough to enable the frame prediction when one or two conditions are met. This may be configurable according to specific implementations.

The second approach may work in parallel to rendering frames on GPU. The entity 100 may analyze data of the next frame from CPU (if this data is available), which is "future" from GPU point of view. Specifically, this may include:

Quality detection based on calculating a difference between camera and dynamic objects parameters in different frames.

Using a fallback mechanism if "future" camera and objects motion behavior differs significantly from the data which was used to construct the predicted frame 1012. The fallback mechanism will be discussed in details in the following part.

The third quality control approach may evaluate a low complexity quality metric over predicted frames on GPU, for example, a number of missing pixels for detecting big in-painting areas and/or excessively large motion to control temporal stability; using the fallback mechanism if artifacts were detected according to its value.

Notably, embodiments of this disclosure further propose dynamic quality estimations for the predicted frames 1012, and fallback mechanisms which give an opportunity to control the ratio between original and predicted frames. Fallback mechanism may refer to disabling frame prediction, discarding a to-be predicted frame during the frame computation/generation, discarding a predicted frame after its generation. Notably, when a predicted frame 1012 is discarded, the entity will stop replacing the original frames 1011 and returning back to the original frame rate.

The concept of using fallback mechanism implemented in the system is based on peculiarities of human visual system related to perception of dynamic and smooth scenes:

If gameplay is extremely dynamic, human visual system is hard to detect quick changes, so fallback might happen often.

However, if gameplay change is smooth, fallback is not desirable but vertex correspondence becomes highly effective in terms of visual quality.

The system may use adaptive fallback mechanism with at least three different modes:

Fallback occurs before generating the predicted frame 1012 due to signal from the first quality control method (implemented based on the first approach for quality estimation) and leads to forcing the graphics application 110 to render original frames 1011.

Fallback occurs after the generation of predicted frames 1012, but before displaying them. If the predicted frame has satisfactory size of in-painting areas, but the second quality control method has informed about possible artifacts, this leads to discarding the predicted frame 1012, then inserting the last original frame 1011 or making the graphics application 110 to show the next original frame.

Fallback occurs during the frame generation due to signal from the third quality control method if the predicted frame doesn't pass the metrics threshold, this leads to discarding predicted frame and inserting the previous original frame.

One of the possible embodiments of the solution according to this disclosure is a system which is represented by the intermediate software layer between applications and graphics API. The system can be integrated with mobile/tablet computer firmware or made as proxy library and works during playing mobile/tablet game.

Mobile phone/tablet computer should contain basic components of graphic system: CPU/GPU, memory, input and output devices. It also should contain an operating system with graphics API support.

An application scenario may include: user starts a mobile game and the entity 100 enabling frame prediction, which may be integrated in phone firmware, starts working.

In one embodiment, the simplest case of image fragments correspondence is used. In particular, the image fragments correspondence is based on 2-component offsets applied to some parts of one of original frame 1011 to match it with another; in this case these 2-component offsets are called MVs. Notably, it is possible that other high-order correspondence models might be applied, such as to improve frames match is some cases.

Figure 5:
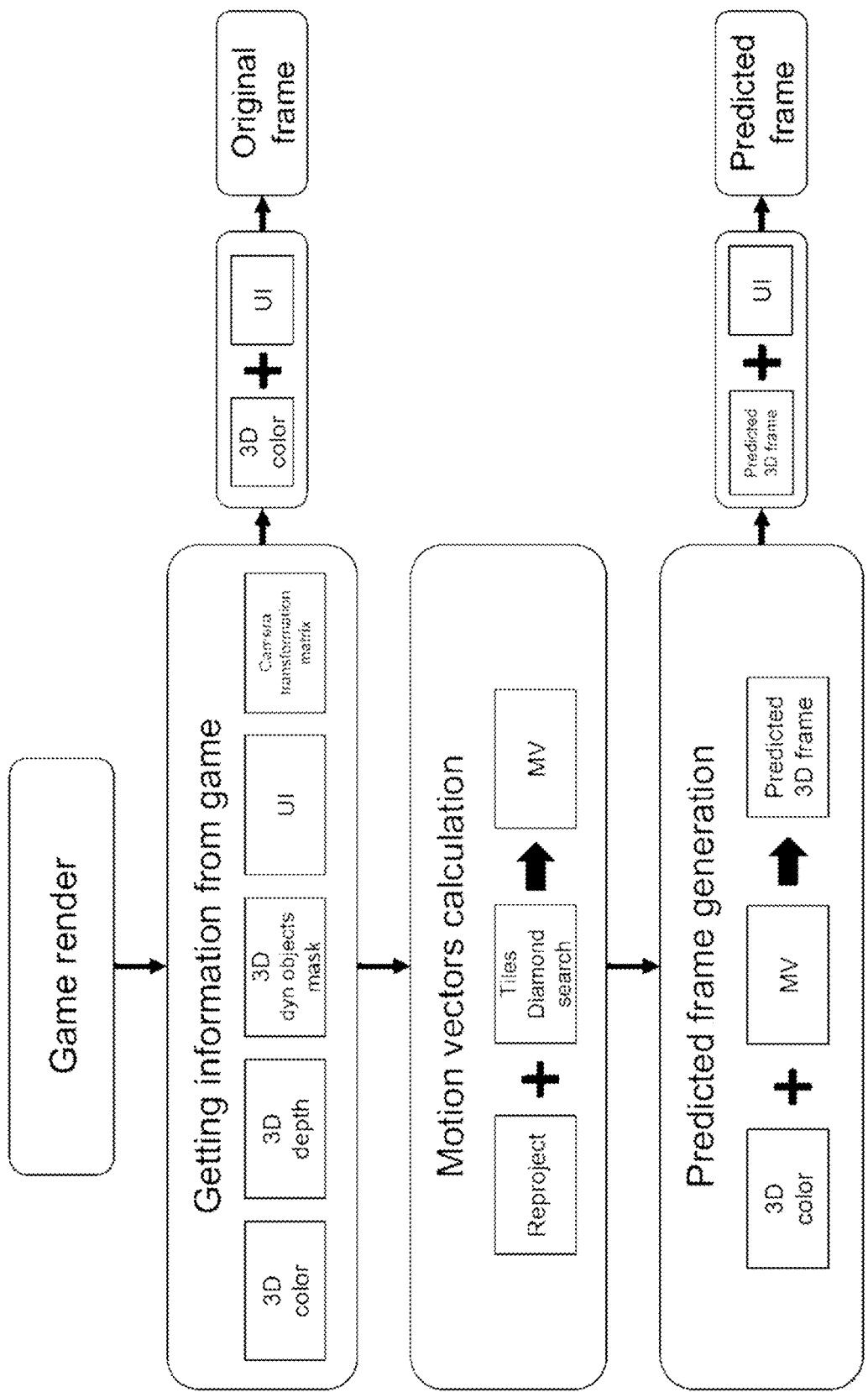
FIG. 5 shows an example of frame prediction pipeline according to an embodiment of the disclosure.

FIG. 5 shows how a game rendering pipeline may be implemented when frame prediction is active. Details of "Motion vectors calculation" block may include:

1. Block calculates a MV between two original frames 1011.

2. UI is separated from the main scene and does not influence MV calculation.

3. For part of pixels which are marked as dynamic objects, determining MV occurs with using one of motion estimation algorithms; to make it more concrete but not limiting generalization. The diamond search motion estimation might be applied. For the remaining pixels which are marked as static objects, MVs may be calculated with a reprojection technique.

4. The reprojection technique is based on using extrapolated MV between static pixels positions in current and previous frames. One of the possible modifications is to predict the future camera position, which is calculated as an extrapolation of the two previous camera positions. Another modification assumes that a future camera transformation will be similar as the transformation between the two previous frames.

Details of "Predicted frame generation" block may include:

1. An in-painting method in current solution is implemented by the blur algorithm, which uses weighted averaging of nearby pixels belonging to static objects.

2. UI is rendered over the predicted frame 1012 and is equal to UI in original frame 1011.

Figure 6:
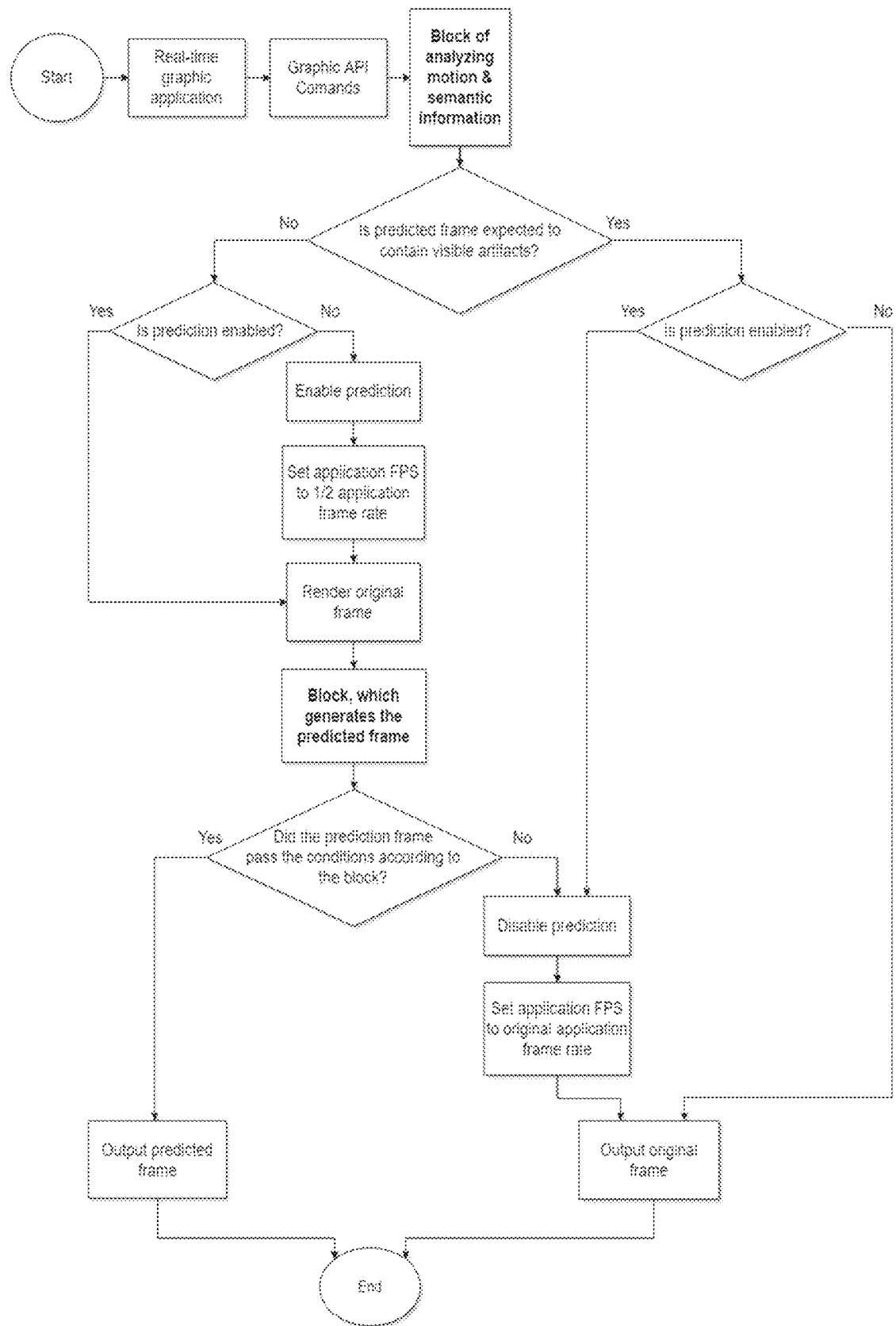
FIG. 6 shows a general scheme of the solution according to an embodiment of the disclosure.

FIG. 6 shows a general scheme of analyzing graphics API calls, extracting semantic information, predicted frame reconstruction, turning the current solution on/off depending on quality criteria evaluated by quality control blocks.

It can be seen that based on an analyzing result of the semantic information, it is determined that whether frame prediction should be enabled. Further, dynamic quality estimation approaches are implemented to decide whether a fallback mechanism is triggered, and thus to decide whether the frame prediction should be disabled. Details of the quality estimation approaches and fallback mechanisms have been described in the previous embodiments.

Figure 7:
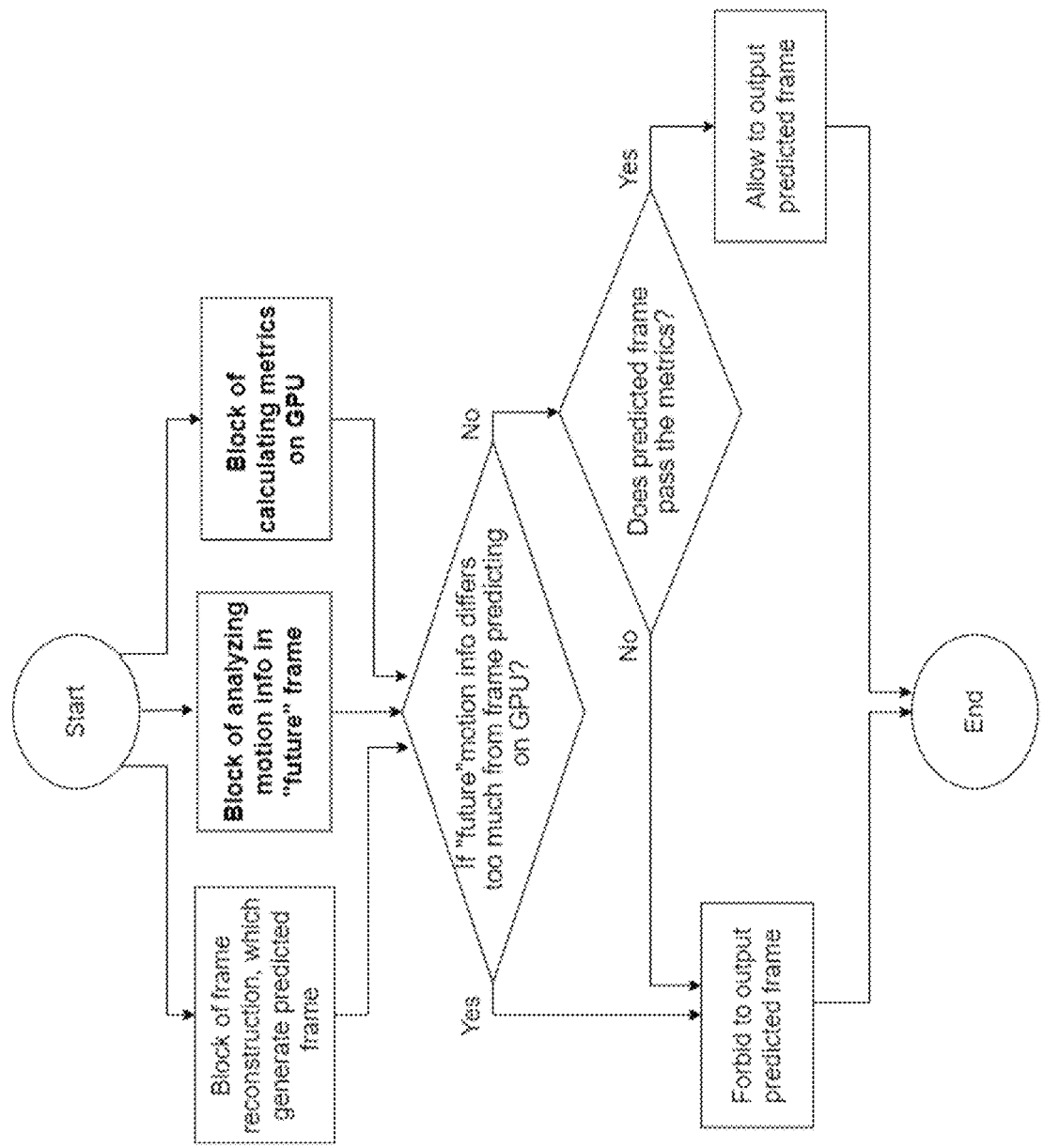
FIG. 7 shows details of a block of FIG. 6 according to an embodiment of the disclosure.

FIG. 7 shows details of a block named "block, which generates the predicted frame" of FIG. 6. In particular, it can be seen that two blocks for quality control work in parallel with the block for predicted frame generation. That is, fallback may occur during the frame generation process. Notably, after the generation of the predicted frames, further quality estimation approaches are also implemented. That is, fallback may also occur after the frame generation process but before the predicted frames are being displayed.

Figure 8:
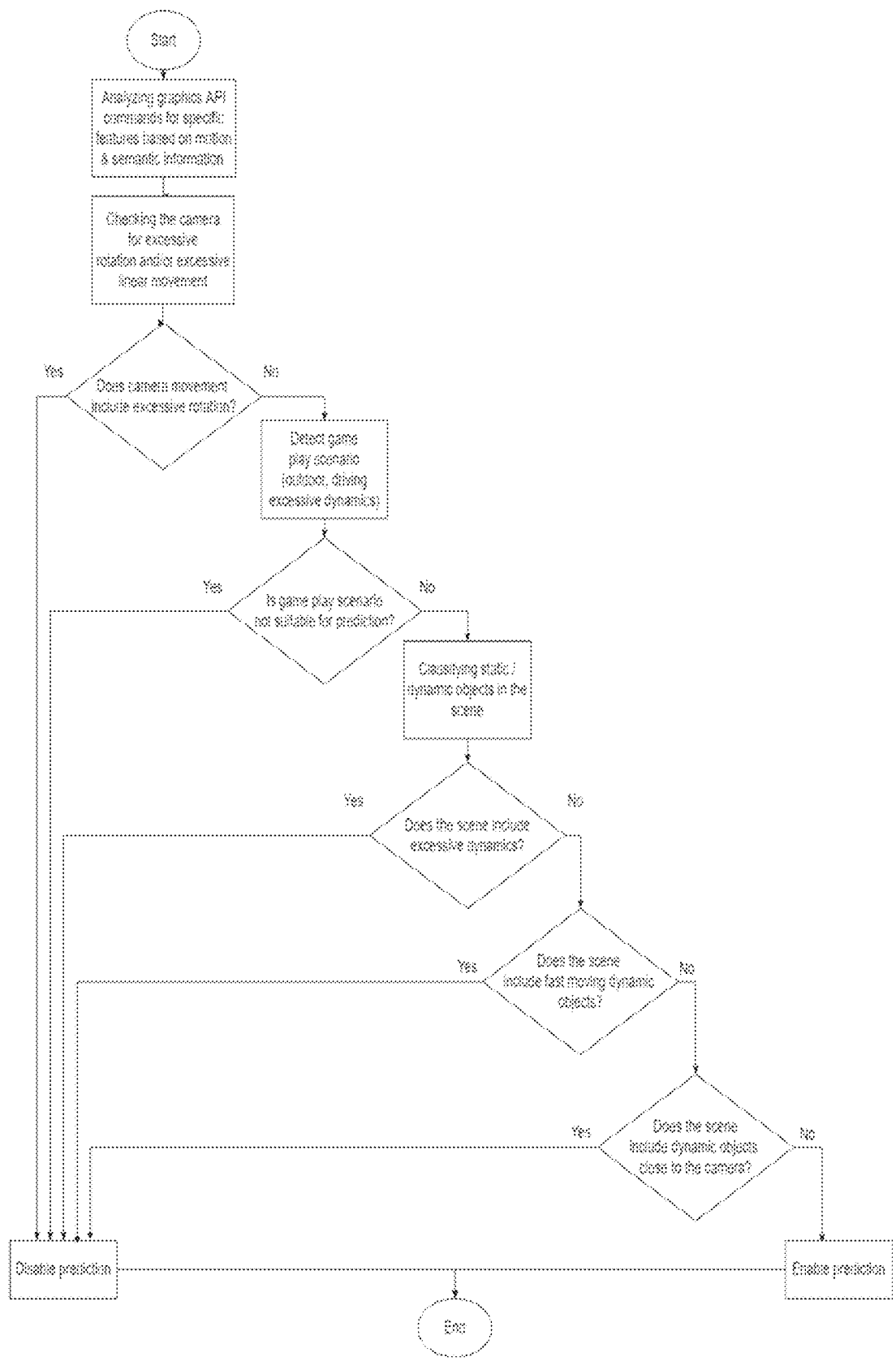
FIG. 8 shows a quality control block according to an embodiment of the disclosure.
Figure 9:
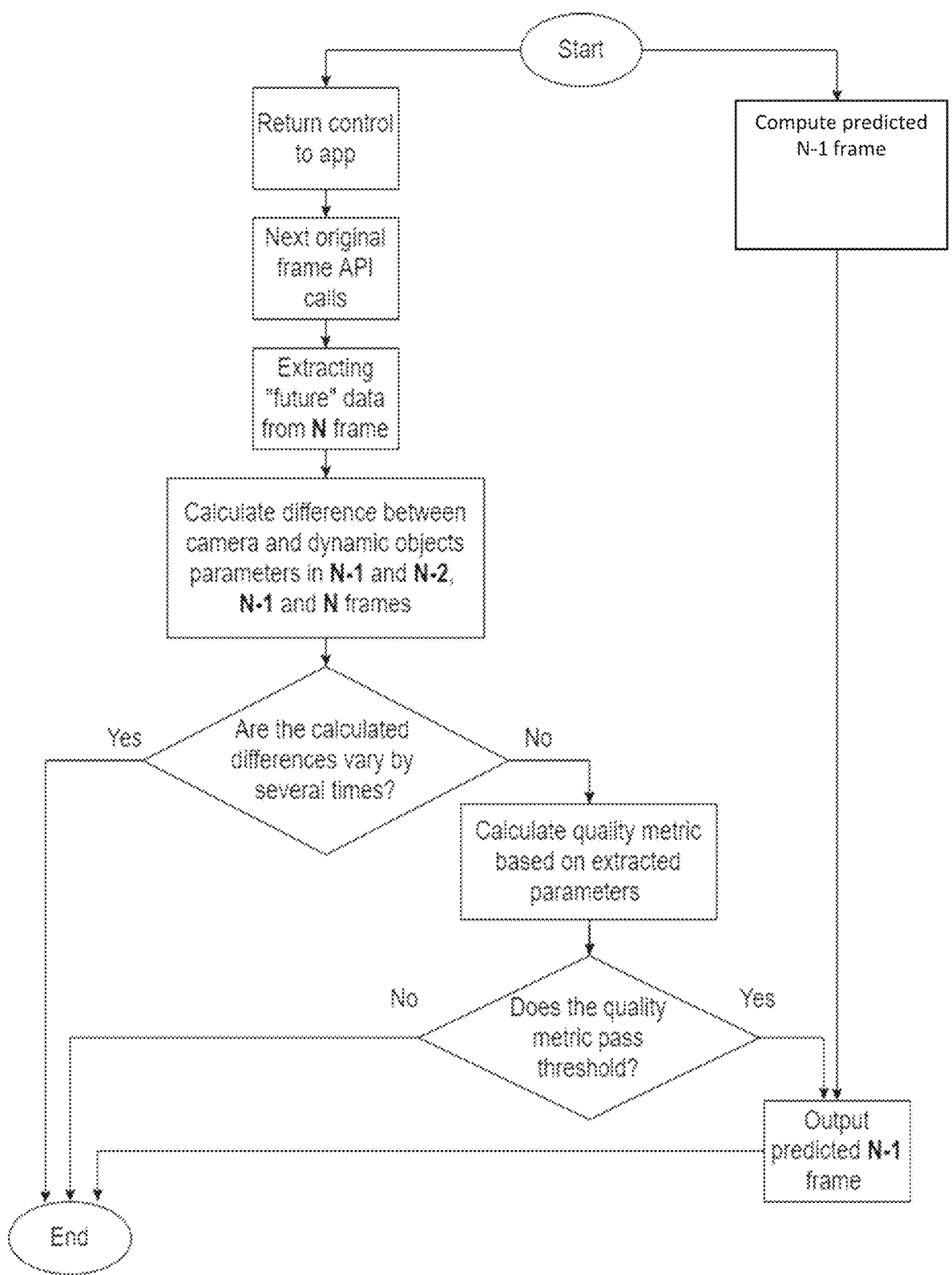
FIG. 9 shows a quality control block according to an embodiment of the disclosure.
Figure 10:
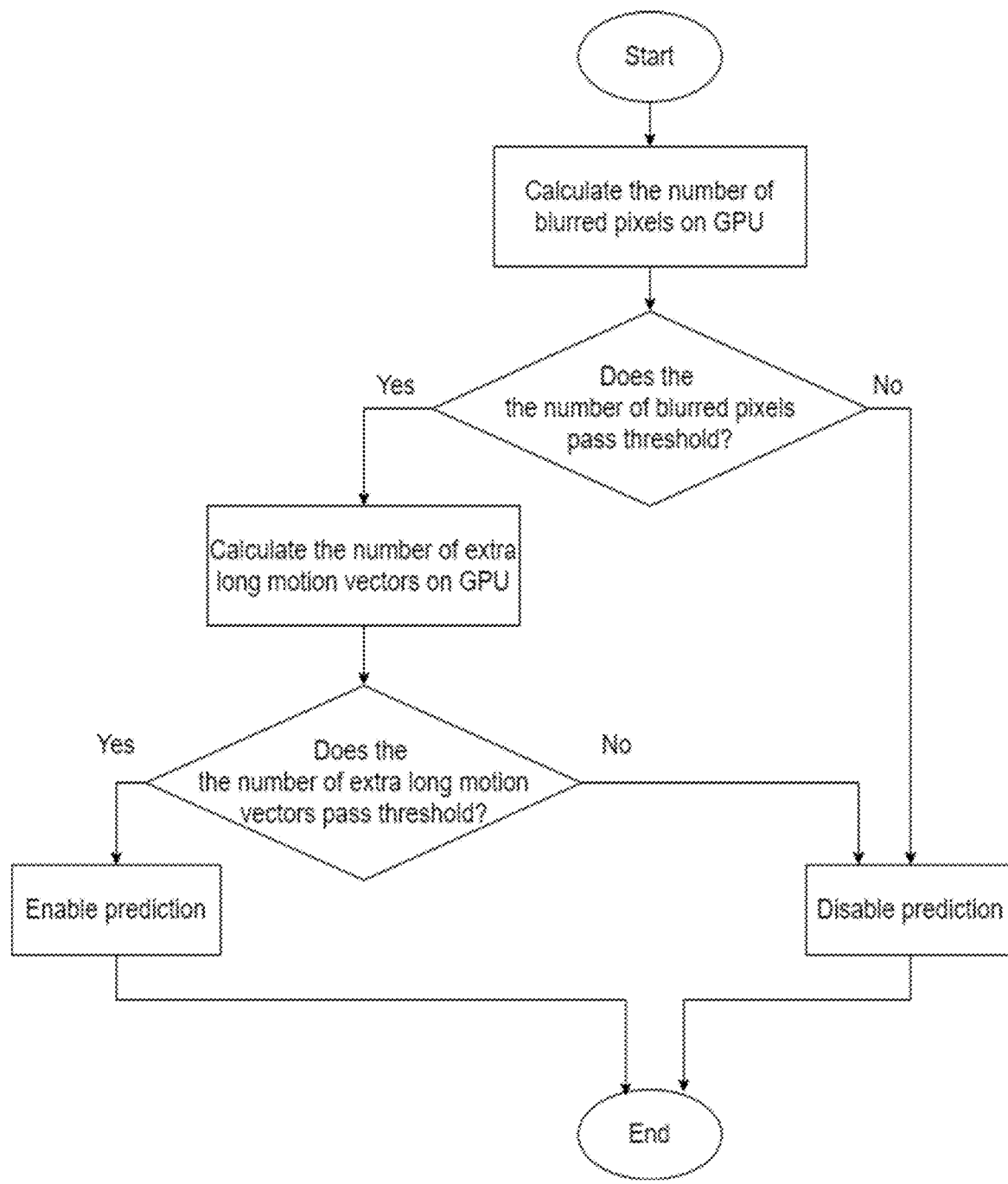
FIG. 10 shows a quality control block according to an embodiment of the disclosure.

FIG. 8, FIG. 9, and FIG. 10 show operations of three quality control blocks according to embodiment of this disclosure, respectively. Each block is implemented according to one of the three approaches for quality estimation (of predicted frames) as previously discussed.

FIG. 8 shows operations of the first quality control block, i.e., for turning on/off the solution depending on the current parameters of camera motion, gameplay scenario and dynamic objects count. FIG. 9 shows operations of the second quality control block, i.e., for turning on/off the solution depending on information about camera motion in the "future" frame. The block operation is possible when the "future" frame is not rendered yet, but camera motion information of the "future" frame is already available. FIG. 10 shows operation of the third quality control block, i.e., for turning on/off the solution depending on analysis of predicted frame on GPU. Details of these three quality estimation approaches have been described in the previous embodiments.

Figure 11:
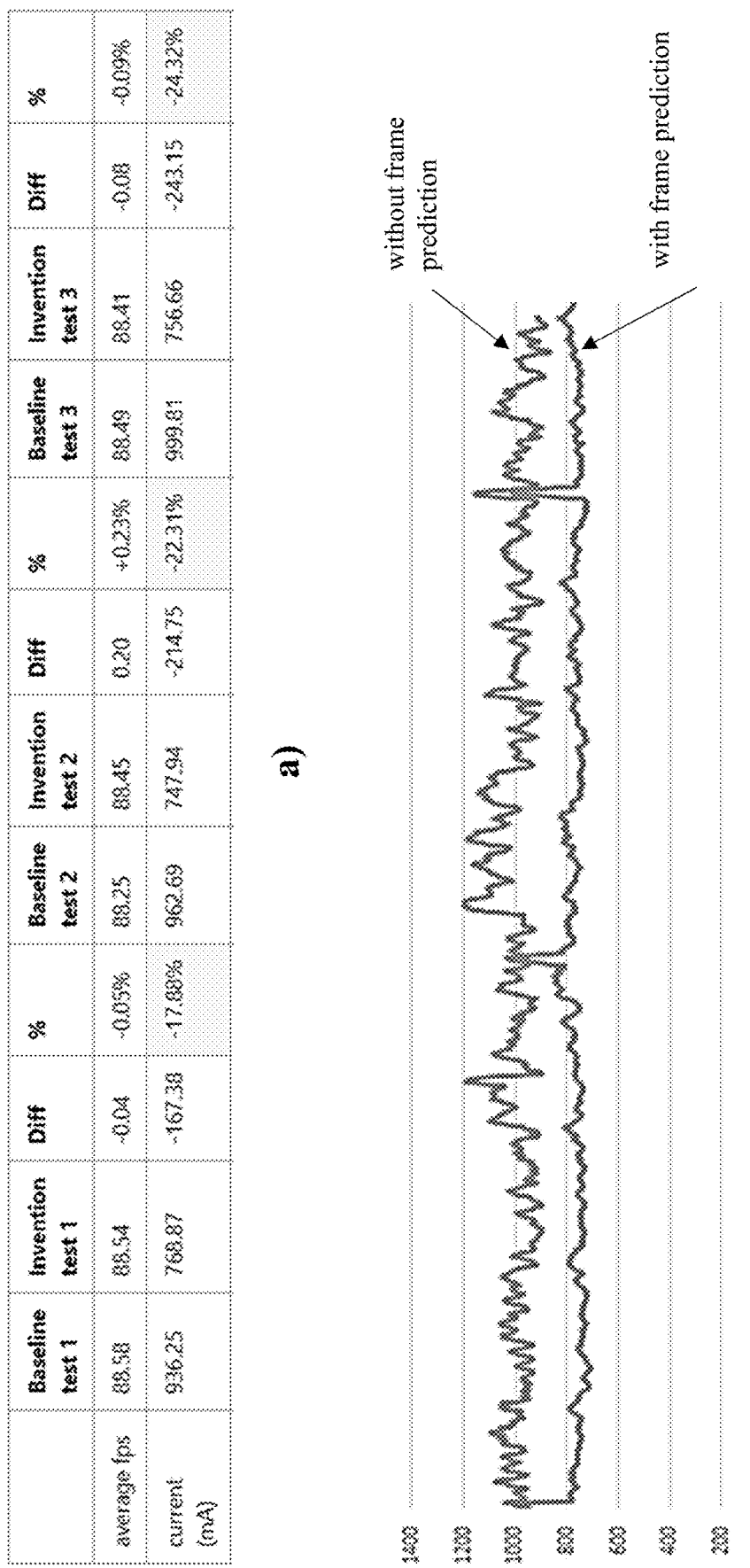
FIG. 11 shows power consumption results of a real gameplay scenario using a conventional approach and using the approach proposed by this disclosure.

FIG. 11 shows technical effects of this embodiment. In particular, FIG. 11*a*) shows power consumption results for real gameplay scenario, i.e., power consumption results of:

original game (e.g., third person shooter) vs the solution proposed in this disclosure being enabled. Measurements were performed at the identical initial temperature of System-on-a-Chip (SoC). FIG. 11b) shows an example of a single measurement, i.e., CPU power consumption from 5 minutes measurement session. In this embodiment, it can be seen that a power consumption benefit on a real gameplay scenario is around 208.43 mA or around 21.50% on average (FIG. 11a)). That is. The power consumption can be saved by around 208.43 mA or around 21.50% on average.

Figure 12:
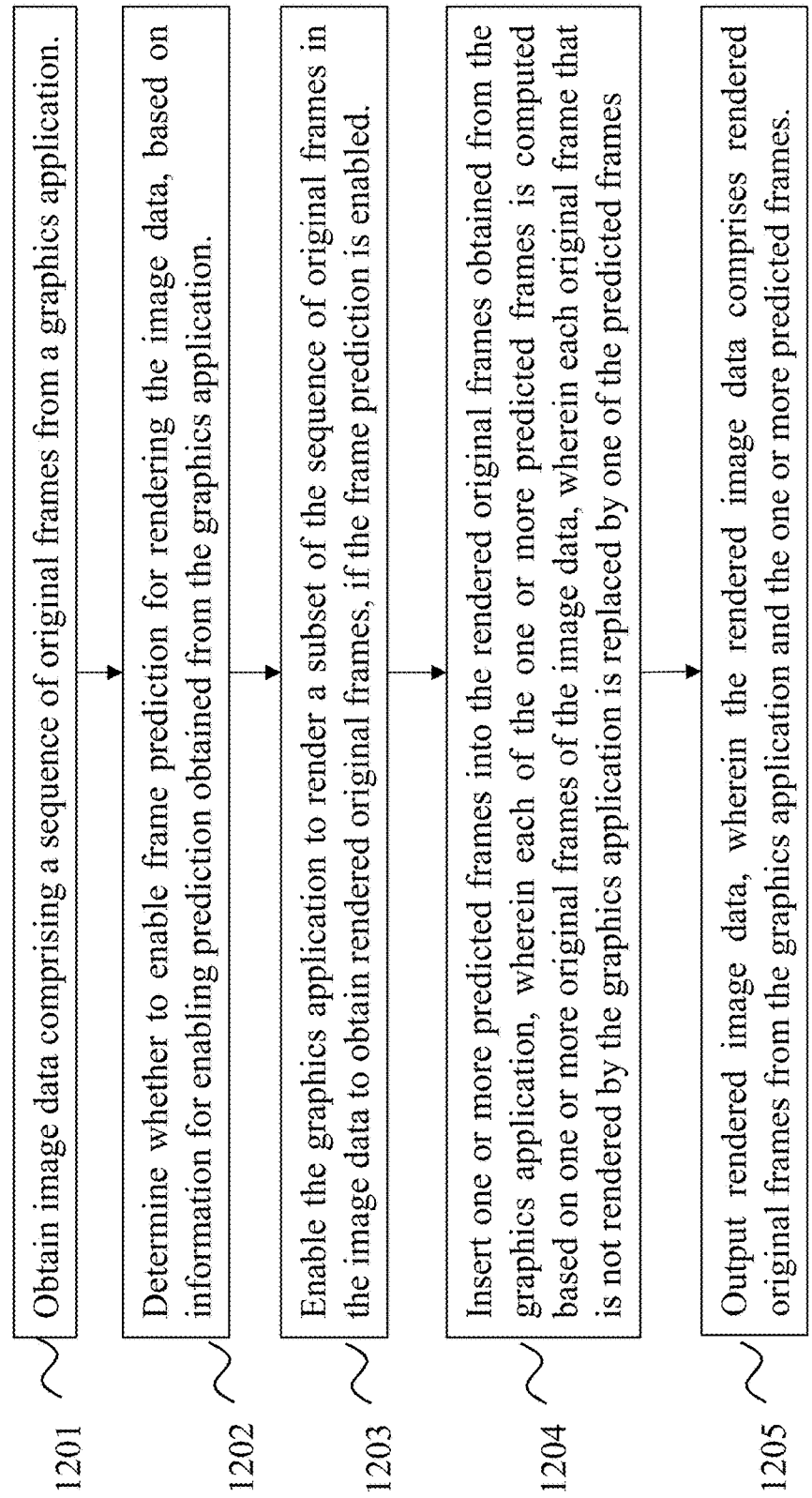
FIG. 12 shows a method according to an embodiment of the disclosure.

FIG. 12 further shows a method 1200 for image data processing according to an embodiment of the disclosure. In a particular embodiment of the disclosure, the method 1200 is performed by an entity 100 as shown in FIG. 1. In particular, the method 1200 comprises: a step 1201 of obtaining image data 101 comprising a sequence of original frames 1011 from a graphics application 110; a step 1202 of determining whether to enable frame prediction for rendering the image data 101, based on information 102 for enabling prediction obtained from the graphics application 110. The method 1200 further comprises a step 1203 of enabling the graphics application 110 to render a subset of the sequence of original frames 1011 in the image data 101 to obtain rendered original frames, if the frame prediction is enabled. Then, the method 1200 further comprises a step 1204 of inserting one or more predicted frames 1012 into the rendered original frames obtained from the graphics application 110, wherein each of the one or more predicted frames 1012 is computed based on one or more original frames 1011 of the image data 101, wherein each original frame 1011 that is not rendered by the graphics application 110 is replaced by one of the predicted frames 1012; and a step 1205 of outputting rendered image data 103, wherein the rendered image data 103 comprises rendered original frames from the graphics application 110 and the one or more predicted frames 101.

To summarize, a main idea of this disclosure is to replace a part of frames generated by a graphics application with predicted frames, which are calculated with so-called reconstruction process. Embodiments of the disclosure includes reconstruction of predicted frames, dynamic quality estimation for predicted frames, fallback mechanisms which give an opportunity to control a ratio between original and predicted frames.

Benefit of this present disclosure over a conventional solution may include:
  Reducing power consumption
  Hardware independent solution
  Adaptive fallback mechanism to maintain visual quality (avoid cases with noticeable visual artifacts)
  Using semantic scene information to achieve high quality of predicted frames while using simple reconstruction algorithm
  Working with third-party apps without requiring modifications to them Notably, the solution proposed in embodiments of the disclosure can apply to real-time graphics applications with high framerate, including games on different platforms, VR applications, smart watches. This solution may be integrated to rendering engine to increase effectiveness of using semantic information to achieve higher quality of predicted frames. Reconstruction is applied to a fraction of the frame, while rendering the rest as usual. This can help to avoid artifacts on objects which are especially hard to predict. Higher-order motion models may be used to account for non-linear object motion. The solution may also be combined with hardware video-codecs to reduce power during motion estimation.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

Furthermore, any method according to embodiments of the disclosure may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the entity 100, comprise the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, trellis-coded modulation (TCM) encoder, TCM decoder, power supply units, power feeders, communication interfaces, communication protocols, etc. which are suitably arranged together for performing the solution.

Especially, the processor(s) of the entity 100 may comprise, e.g., one or more instances of a CPU, a GPU, a NPU, a processing unit, a processing circuit, a processor, an ASIC, a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

The invention claimed is:
1. A terminal, comprising:
  one or more processors; and
  a non-transitory memory configured to store processor-executable instructions, wherein when executing the instructions, the one or more processors is configured to implement the steps:
    obtaining image data comprising a sequence of original frames from a graphics application;
    determining whether to enable frame prediction to render the image data based on prediction enabling information obtained from the graphics application;
    enabling the graphics application to render a first subset of the sequence of original frames in the image data and to not render a second subset of the sequence of original frames in the image data to obtain rendered original frames, when the frame prediction is enabled;

after enabling the graphics application to render the first subset of the sequence of original frames and to not render the second subset of the sequence of original frames to obtain the rendered original frames, inserting one or more predicted frames into the rendered original frames obtained from the graphics application, wherein each of the one or more predicted frames is computed based on one or more original frames of the image data, wherein each of the second subset of the sequence of original frames that is not rendered by the graphics application is replaced by one of the one or more predicted frames; and outputting rendered image data, wherein the rendered image data comprises rendered original frames from the graphics application and the one or more predicted frames.

2. The terminal according to claim 1, wherein the prediction enabling information includes a first set of information, and wherein when executing the instructions, the one or more processors is further configured to implement the steps:

obtaining the first set of information by analyzing graphics application programming interface commands from the graphics application, wherein the first set of information comprises color information related to the image data, and the first set of information further comprises depth information related to the image data, a first class object mask, a second class object mask, or one or more camera matrices.

3. The terminal according to claim 1, wherein the prediction enabling information includes a second set of information, and wherein when executing the instructions, the one or more processors is further configured to implement the steps:

analyzing graphics application programming interface commands from the graphics application to obtain a first set of information including color information related to the image data, the first set of information further comprising depth information related to the image data, a first class object mask, a second class object mask, or one or more camera matrices; and extracting a second set of information based on the first set of information, wherein the second set of information comprises a current graphics application scenario, object classification, a camera position, a camera orientation, or a camera movement behavior.

4. The terminal according to claim 3, wherein when executing the instructions, the one or more processors is further configured to implement the steps:

classifying objects of the image data into at least a first class and a second class based on the first set of information, wherein an object of the first class has a constant position within a coordinate system, and an object of the second class has a dynamic position within the coordinate system.

5. The terminal according to claim 4, wherein when executing the instructions, the one or more processors is further configured to implement the steps:

determining to enable the frame prediction, when one or more of the following conditions are met:

the current graphics application scenario matches one or more predetermined graphics application scenarios;

rotation or linear movement of the camera movement behavior is below a first threshold; or a ratio of objects of the first class and objects of the second class does not exceed a second threshold.

6. The terminal according to claim 5, wherein when executing the instructions, the one or more processors is further configured to implement the steps:

computing the one of more predicted frames using a frame-warping process.

7. The terminal according to claim 6, wherein when executing the instructions, the one or more processors is further configured to implement the steps:

calculating a correspondence between at least two original frames of the image data; and computing the one or more predicted frames based on the correspondence between the at least two original frames of the image data and based on at least one original frame of the image data.

8. The terminal according to claim 7, wherein each original frame of the image data comprises a plurality of image fragments, wherein when calculating the correspondence between the at least two original frames of the image data, the one or more processors is further configured to implement the steps:

calculating an image fragment correspondence between at least two image fragments of the at least two original frames using a first algorithm when the at least two image fragments of the at least two original frames are marked as one or more objects of the first class; or calculating an image fragment correspondence between at least two image fragments of the at least two original frames using a second algorithm when the at least two image fragments of the at least two original frames are marked as one or more objects of the second class.

9. The terminal according to claim 8, wherein when computing the one or more predicted frames using the frame-warping process, the one or more processors is further configured to implement the steps:

computing one or more predicted image fragments for the one or more predicted frames using the frame-warping process based on the image fragment correspondence and at least one image fragment.

10. The terminal according to claim 9, wherein when computing the one or more predicted frames using the frame-warping process, the one or more processors is further configured to implement the steps:

filling a missing area of the one or more predicted frames after performing the frame-warping process, using an in-painting method, wherein the one or more predicted frames comprises a plurality of predicted image fragments, and the missing area is a part of the one or more predicted frames other than the one or more predicted image fragments.

11. The terminal according to claim 10, wherein the image fragment correspondence comprises a motion vector, and wherein the first algorithm comprises a reprojection technique, and wherein the second algorithm comprises a motion estimation algorithm.

12. The terminal according to claim 11, wherein the frame-warping process comprises:

constructing one or more grids for the at least two original frames within the coordinate system; and performing the frame-warping process according to the one or more grids.

13. The terminal according to claim 12, wherein when executing the instructions, the one or more processors is further configured to implement the steps:

evaluating a quality of each of the one or more predicted frames; and discarding a first predicted frame of the one or more predicted frames when the quality of the first predicted frame does not fulfill one or more requirements.

14. The terminal according to claim 13, wherein when evaluating the quality of each of the one or more predicted frames, the one or more processors is further configured to implement the steps:

evaluating a quality metric over each of the one or more predicted frames on a graphic processing unit; and determining whether the quality of each of the one or more the predicted frames fulfills the one or more requirements based on one or more artifacts detected according to the quality metric.

15. The terminal according to claim 13, wherein when evaluating the quality of each of the one or more predicted frames, the one or more processors is further configured to implement the steps:

analyzing data of a following original frame obtained from a central processing unit, wherein the following original frame is a frame next to the original frame replaced by the predicted frame; and determining whether the quality of each of the one or more predicted frames fulfills the one or more requirements based on whether a difference between the data of the following original frame and the one or more predicted frames exceeds a second threshold.

16. The terminal according to claim 1, wherein the graphics application comprises a game application, an augmented reality application, or a virtual reality application.

17. The terminal according to claim 1, wherein the terminal further comprises a display, and wherein when executing the instructions, the one or more processors is further configured to implement the steps:

outputting the rendered image data to the display to display the image data of the graphics application.

18. A method, comprising:

obtaining, by an entity, image data comprising a sequence of original frames from a graphics application;

determining, by the entity, whether to enable frame prediction to render the image data, based on prediction enabling information obtained from the graphics application;

enabling, by the entity, the graphics application to render a first subset of the sequence of original frames in the image data and to not render a second subset of the sequence of original frames in the image data to obtain rendered original frames, when the frame prediction is enabled;

after enabling the graphics application to render the first subset of the sequence of original frames and to not render the second subset of the sequence of original frames to obtain the rendered original frames, inserting, by the entity, one or more predicted frames into the rendered original frames obtained from the graphics application, wherein each of the one or more predicted frames is computed based on one or more original frames of the image data, wherein each of the second subset of the sequence of original frames that is not rendered by the graphics application is replaced by one of the one or more predicted frames; and outputting, by the entity, rendered image data, wherein the rendered image data comprises rendered original frames from the graphics application and the one or more predicted frames.

19. The method according to claim 18, wherein the prediction enabling information includes a first set of information, and the method further comprises:

obtaining the first set of information by analyzing graphics application programming interface commands from the graphics application, wherein the first set of information comprises color information related to the image data, and the first set of information further comprises depth information related to the image data, a first class object mask, a second class object mask, or one or more camera matrices.

20. The method according to claim 18, wherein the prediction enabling information includes a second set of information, and wherein the method further comprises:

analyzing graphics application programming interface commands from the graphics application to obtain a first set of information including color information related to the image data, and the first set of information further comprises depth information related to the image data, a first class object mask, a second class object mask, or one or more camera matrices; and extracting the second set of information based on the first set of information, wherein the second set of information comprises a current graphics application scenario, object classification, a camera position, a camera orientation, or a camera movement behavior.

21. The entity according to claim 20, wherein the method further comprises:

classifying objects of the image data into at least a first class and a second class based on the first set of information, wherein an object of the first class has a constant position within a coordinate system, and an object of the second class has a dynamic position within the coordinate system.

22. A computer program product comprising a program code for carrying out, when implemented on one or more processors, a method; and a non-transitory memory configured to store processor-executable instructions, wherein when executing the instructions, the one or more processors is configured to implement the steps:

obtaining image data comprising a sequence of original frames from a graphics application;

determining whether to enable frame prediction to render the image data, based on prediction enabling information obtained from the graphics application;

enabling the graphics application to render a first subset of the sequence of original frames in the image data and to not render a second subset of the sequence of original frames in the image data to obtain rendered original frames, when the frame prediction is enabled;

after enabling the graphics application to render the first subset of the sequence of original frames and to not render the second subset of the sequence of original frames to obtain the rendered original frames, inserting one or more predicted frames into the rendered original frames obtained from the graphics application, wherein each of the one or more predicted frames is computed based on one or more original frames of the image data, wherein each of the second subset of the sequence of original frames that is not rendered by the graphics application is replaced by one of the one or more predicted frames; and outputting rendered image data, wherein the rendered image data comprises rendered original frames from the graphics application and the one or more predicted frames.

* * * * *